US009581798B2

(12) United States Patent
Loza Alvarez et al.

(10) Patent No.: US 9,581,798 B2
(45) Date of Patent: Feb. 28, 2017

(54) LIGHT SHEET-BASED IMAGING DEVICE WITH EXTENDED DEPTH OF FIELD

(71) Applicants: FUNDACIÓ INSTITUT DE CIÈNCIES FOTÒNIQUES, Castelldefels, Barcelona (ES); UNIVERSITAT POLITÈCNICA DE CATALUNYA, Barcelona (ES)

(72) Inventors: Pablo Loza Alvarez, Barcelona (ES); Omar Eduardo Olarte Pataquiva, Barcelona (ES); David Artigas Garcias, Barcelona (ES)

(73) Assignees: Fundacio Institut de Ciencies Fotoniques, Barcelona (ES); Universitat Politecnica De Catalunya, Barcelona (ES)

( * ) Notice: Subject to any disclaimer, the term of this patent is extended or adjusted under 35 U.S.C. 154(b) by 0 days.

(21) Appl. No.: 13/947,523

(22) Filed: Jul. 22, 2013

(65) Prior Publication Data
US 2015/0022881 A1    Jan. 22, 2015

(51) Int. Cl.
G02B 21/06 (2006.01)
G02B 27/00 (2006.01)
G02B 21/00 (2006.01)
G02B 21/36 (2006.01)

(52) U.S. Cl.
CPC ......... *G02B 21/06* (2013.01); *G02B 21/0076* (2013.01); *G02B 21/367* (2013.01); *G02B 27/0075* (2013.01)

(58) Field of Classification Search
CPC .......................... G02B 21/06; G02B 21/0032
USPC .............................................. 359/4, 362-435
See application file for complete search history.

(56) References Cited

U.S. PATENT DOCUMENTS

| 3,493,290 | A  | * | 2/1970 | Traub ............................ 359/479 |
| 7,180,673 | B2 | * | 2/2007 | Dowski, Jr. ................... 359/637 |
| 8,441,633 | B2 | * | 5/2013 | Truong et al. ................ 356/301 |
| 2005/0224695 | A1 | * | 10/2005 | Mushika .................... 250/208.2 |
| 2010/0008597 | A1 | * | 1/2010 | Findlay et al. ............... 382/275 |
| 2010/0265575 | A1 | * | 10/2010 | Lippert et al. ................ 359/385 |
| 2010/0309548 | A1 | * | 12/2010 | Power et al. ................. 359/385 |

(Continued)

FOREIGN PATENT DOCUMENTS

WO    2011059826 A2    5/2011

OTHER PUBLICATIONS

Spring, Kenneth and Davidson, Michael. "Depth of Field and Depth of Focus." Nikon MicroscopyU. Nikon. Feb. 27, 2009. http://www.microscopyu.com/print/articles/formulas/formulasfielddepth-print.html.*

(Continued)

*Primary Examiner* — Ricky Mack
*Assistant Examiner* — Kristina Deherrera
(74) *Attorney, Agent, or Firm* — Ostrolenk Faber LLP (57) ABSTRACT

Light sheet microscope for recording 3D images of a specimen, comprising a light sheet generator, an objective lens, an image detector and a wavefront encoder element or system positioned between the objective lens and the image detector for extending the depth of field of the objective lens. By doing so, the restriction on the distance between the collecting objective and the light sheet is relaxed, allowing the use of a light sheet scanning unit. The resulting light sheet microscope allows for a robust, aberration insensitive, fast 3D imaging without the need to move or perturb the specimen.

12 Claims, 8 Drawing Sheets

(56) References Cited

U.S. PATENT DOCUMENTS

2012/0049087 A1* 3/2012 Choi ................. G01N 21/4795
250/459.1

OTHER PUBLICATIONS

European Search Report and Written Opinion for EP14177272.3 dated Nov. 11, 2014, 7pgs.
Maurer, et al., "What Spatial Light Modulators cn do for Otical Micoscopy," 2001, Department of Engineering Science, University of Oxford, Laser Photonics, Rev. 5, No. 1, pp. 81-101.

* cited by examiner

LIGHT SHEET-BASED IMAGING DEVICE WITH EXTENDED DEPTH OF FIELD

FIELD OF THE INVENTION

The present invention relates to imaging devices in which a specimen is illuminated by means of a light sheet and imaged with an objective whose depth of field has been extended by using a wavefront encoder element or system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Light sheet microscopy (LSM) is a technique in which an specimen under investigation is illuminated with a sheet of laser light such that the fluorescence emitted from the specimen is recorded in the orthogonal direction with an image detector (such as a CCD, CMOS, sCMOS cameras or equivalent/similar). Optical sections are obtained by moving the object, which can then be combined to obtain a 3D representation of the object.

LSM has wide range of variants that have been developed in recent years, adopting names such that Selective Plane Illumination Microscopy (SPIM), Ultramicroscopy, Digital Scanned Laser Light Sheet Fluorescence Microscopy (DSLM), Orthogonal Plane Fluorescence Optical Sectioning (OPFOS), Thin Laser Light Sheet Microscopy (TLSM), Objective Coupled Planar Illumination (OCPI), among others. (See, e.g., Siedentopf, H. & Zsigmondy, R., Ann. Phys.-Berlin 10, 1-39 (1902); Voie, A. H., et al., J. Microsc.-Oxf. 170, 229-236 (1993); Fuchs, E., et al., Opt. Express 10, 145-154 (2002); Huisken, J., et al., Science 305, 1007-1009 (2004); Holekamp, T. F., et al., Neuron 57, 661-672 (2008); Dodt, H. U. et ai, Nat. Methods A, 331-336 (2007); Huisken, J. & Stainier, D. Y. R., Developments, 1963-1975 (2009); and Keller, P. J. & Stelzer, E. H. K., Curr. Opin. Neurobiol. 18, 624-632 (2008), and patents US2012098949 A1, US 20070109633 A1, EP 2444833 A1 and EP 2494399 A2, the disclosures of each of which is incorporated herein by reference).

All the set-ups for LSM to date come with a number of problems:

The alignment is critical. The distance of the objective to the light-sheet must be set with a precision of microns within the DoF of the objective, and the light sheet must be at 90° from the optical axis of the collection objective.

A change of the collection objective requires realignment and adjustment of the distance between the object and the light sheet.

Changes in the internal refractive index of the specimen effectively change the focal distance of the objective and can induce deformations, curvature and other inhomogeneities of the light sheet. These may result in a loss of focal position and therefore in a blurred image.

To obtain a 3D image
  The object needs to be moved (either in the z direction or rotated).
  Both the light sheet and the collection objective must be scanned (displaced) in the z direction, always maintaining constant the distance with the light sheet.

Both of these induce mechanical movements or pressure waves that may interfere with the specimen and the measurement.

All the above mentioned points prevent the technique to be used for fast 3D imaging of biological specimens. Moreover, for in-vivo imaging the movement can perturb the specimen behaviour and development, resulting in an invasive technique.

It is desirable for an imaging system to overcome the problems described above.

SUMMARY OF PREFERRED EMBODIMENTS

The present invention comprises the use of a Wavefront Encoding (WFE) element or WFE system that is placed at the exit pupil of the objective lens in the collection arm of a Light Sheet Microscope (LSM). This WFE element or system is used to extend the depth of field of the imaging system in LSM.

By combining LSM and WFE techniques it is possible to overcome several related problems as mentioned above. In brief, the use of WFE in the detection arm of the LSM results in an extended DoF which relaxes the restriction on the distance between the collecting objective and the light sheet. As a result, the alignment is non-critical, there is no need to carefully readjust the objective distance if replaced by another one, the changes in the focal distance of the objective and deformations of the light sheet caused by variations in the internal refractive index of the specimen are not critical, and finally, it allows for fast 3D imaging by only scanning the light sheet across the object without the need of moving neither the specimen nor the collection objective. In addition, thanks to the light sheet scanning, the problems described above in WFE techniques are not present in the invention, since the 3D reconstruction is possible, the lateral shift and change on magnification can be calibrated and corrected, the scanning amplitude can be adjusted to the DoF to avoid noise light generated outside the DoF and the PSF can be calibrated at every plane. A final advantage of the presented mixed approach is that WFE techniques mitigate the aberrations in the detection path.

BRIEF DESCRIPTION OF THE DRAWINGS

To complete the description and in order to provide for a better understanding of the invention, a set of drawings is provided. Said drawings illustrate preferred embodiments of the invention, which should not be interpreted as restricting the scope of the invention, but are an example of how the invention can be embodied.

DESCRIPTION OF PREFERRED EMBODIMENTS

The invention relies on the use of WFE to extend the depth of field of the collection objective in light sheet microscopy (LSM).

According to preferred embodiments of the invention, a light sheet microscope is composed of a light source, generally a laser, a light sheet generator, a chamber with the specimen holder. Perpendicular to the direction of the plane of the light sheet there is the imaging system that includes a collection objective placed at a distance from the light sheet equal to the focal distance, and an image detector (such as a CCD, CMOS, sCMOS camera or equivalent/similar).

Figure 1:
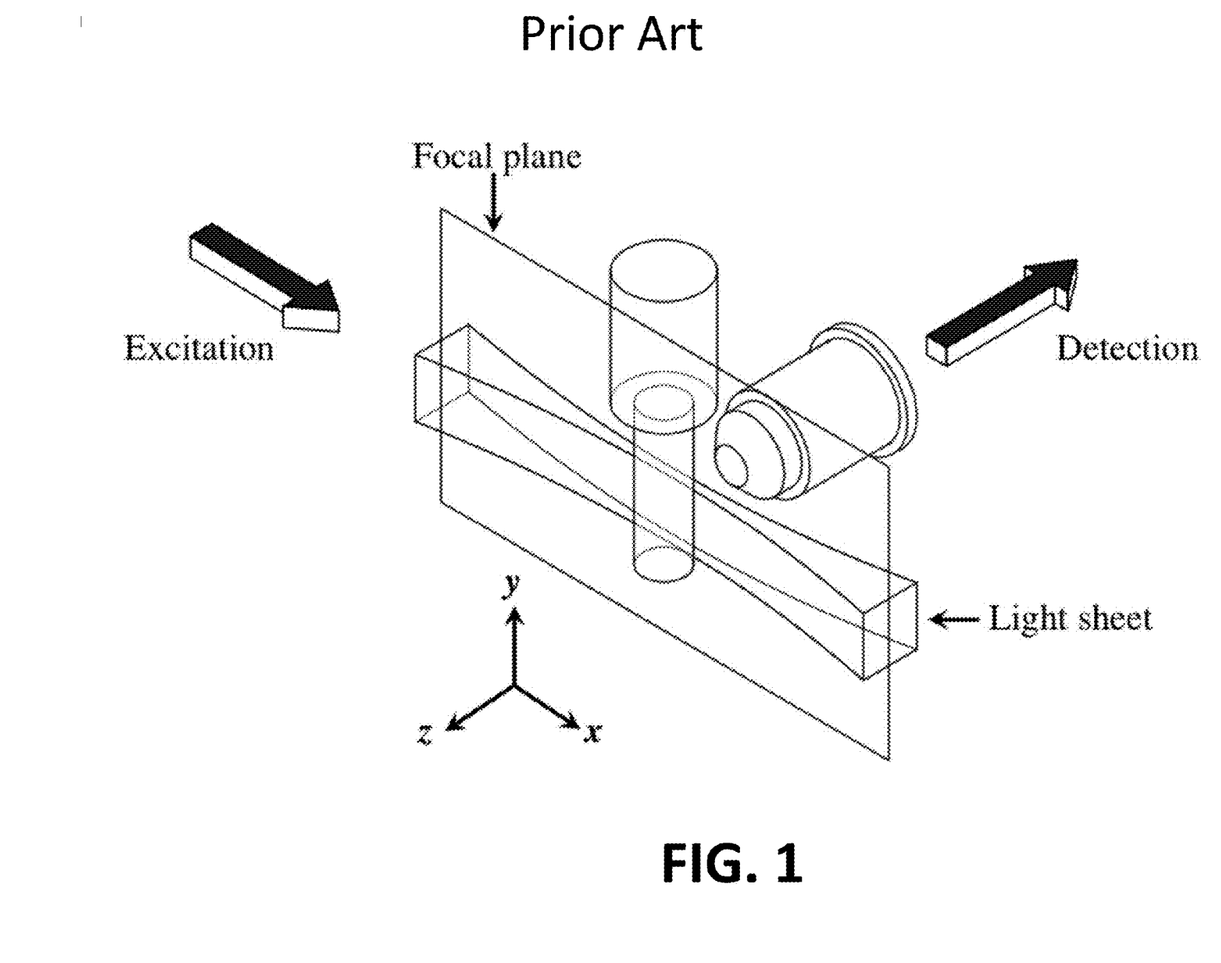
FIG. 1 is a diagram showing a schematic of a standard light-sheet microscopy system, as used in some embodiments of the invention.

In one example of an LSM, the light of a source, generally a laser, is adapted to generate a light sheet. According to the preferred embodiments, the light sheet can be created by using a cylindrical lens as these optical elements focus the beam in a direction (z) perpendicular to the beam propagation (x), resulting in a light sheet in the x-y plane. FIG. 1 shows a schematic of such a standard light-sheet microscopy system. Light sheet illumination is sent to the specimen. The specimen is usually rotated or translated across the light sheet. Detection of the generated signal is performed orthogonal to the light sheet.

Figure 2:
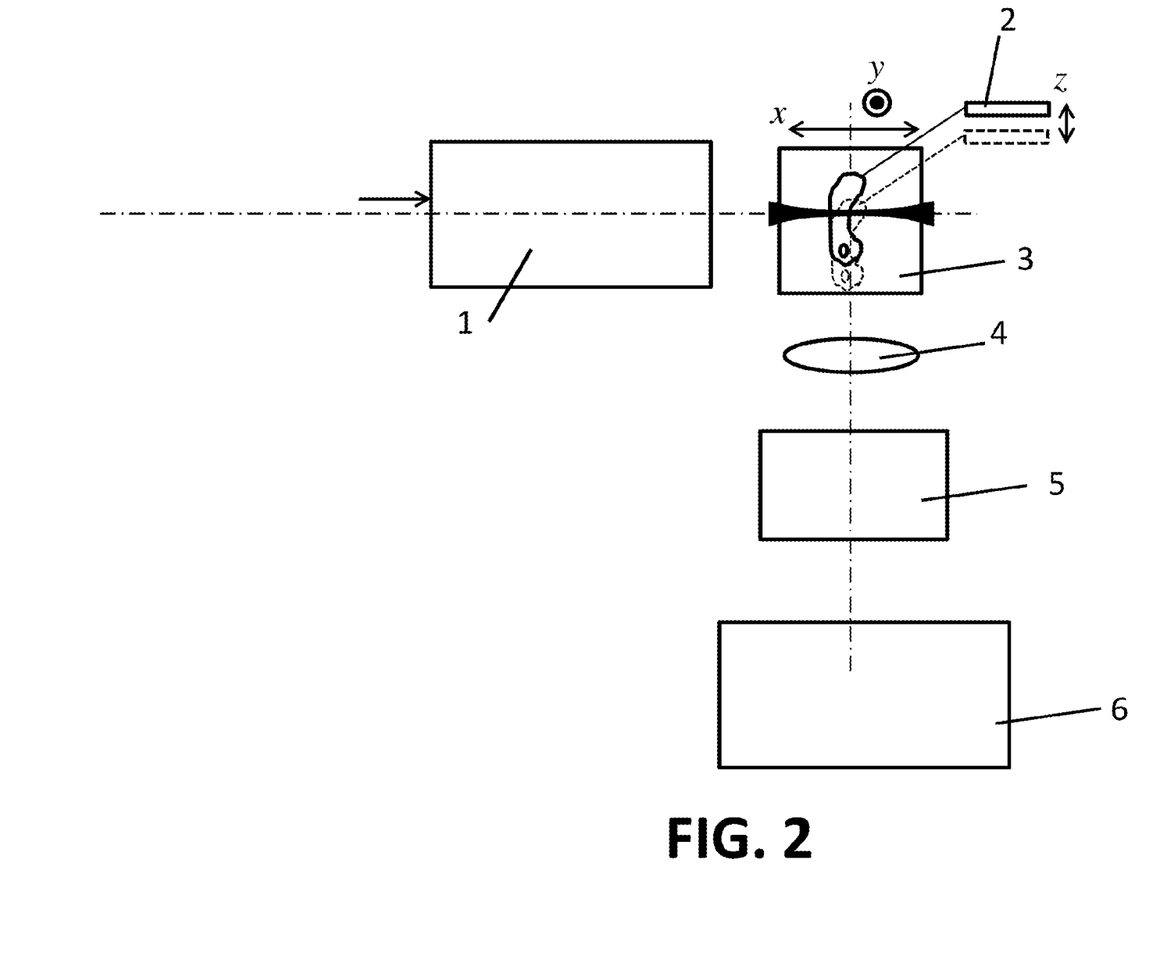
FIG. 2 is a diagram showing a detailed schematic of a standard light-sheet microscopy system, as used in some embodiments of the invention.

An alternative method, as shown in FIG. 2, consists in creating the light sheet dynamically using a beam with equal or similar width or section in the y and z directions and scanning the beam in the y direction, at high speed, to create the light sheet. In this last case, the beam can have different transversal intensity profiles, for example Gaussian beam or Bessel beams. Other beam intensity profiles could also be used such as 2D or 3D patterns generated by interference of light. Once the sheet of light is generated, it is used to illuminate the specimen to be imaged.

FIG. 2 shows a detailed schematic of such a standard light-sheet microscopy system. A light sheet generator, 1, projects the sheet of light on the specimen. The specimen is supported by a specimen holder, 2, which is normally contained into a physiological chamber, 3, and moved in the z direction, or rotated (not shown in the image for clarity) across the light sheet. The generated light is captured orthogonally to the light sheet by an objective lens, 4, that projects an image of the generated light from the illuminated part of the object onto a detection unit, 5. The detection units contains an image detector and may also include other elements, such as tube lenses, zoom systems, filters, etc. The captured images are then digitally processed by the digital processing unit, 6, to retrieve the information of the specimen. The light generated at the specimen is usually described by any of the following physical processes: reflected/refracted/scattered light, the generation of fluorescence by one photon or two-photon absorption, the generation of second and third harmonic light, among others. The generated signal is then detected in the z direction, which is perpendicular to the light sheet (i.e., perpendicular to both the x and y direction) to form an image in an image detector by means of a collection objective and an appropriate imaging system (see FIG. 2). In this arrangement, the collection objective is at a distance in the z direction equal to the objective focal distance, with a tolerance corresponding to the depth of field of the objective (in the order of a few microns) to obtain in this way a clear 2D image generated by the plane illuminated with the light sheet.

Figure 3:
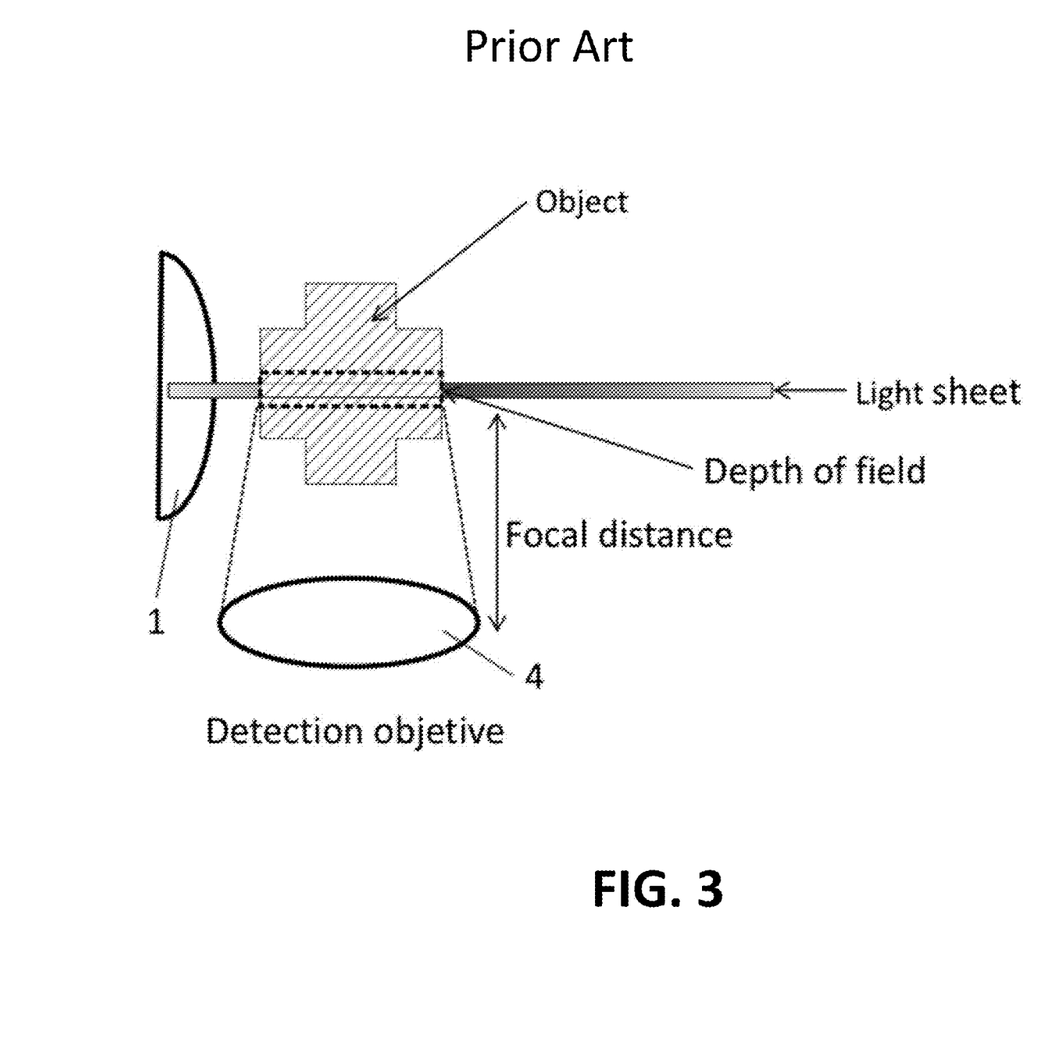
FIG. 3 is a diagram depicting a standard LSM, as used in some embodiments of the invention.

As can be seen in FIG. 3, in the standard LSM, the light sheet is projected into the specimen through a light sheet generator, 1. The objective lens, 4, is placed at a distance equal to its focal length from the position of the light sheet. This distance is kept fixed within the objective depth of field (DoF). The objective lens forms a 2D image of the object that is being illuminated by the light sheet. In this case, the depth of field of the objective lens is determined by the used objective.

Figure 4:
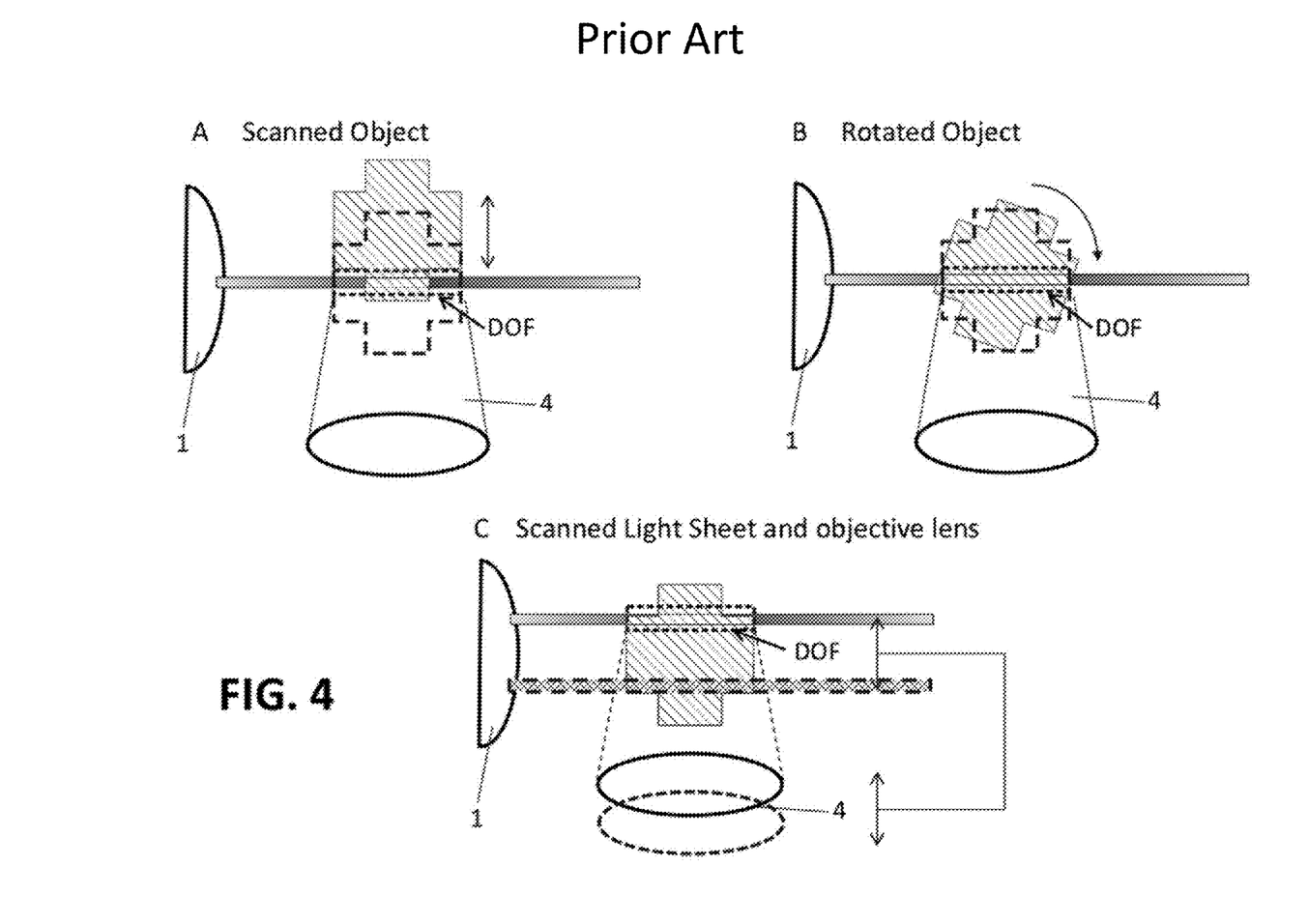
FIG. 4 is a diagram showing displacement of the specimen and/or objective lens in LSM, according to an example use of LSM.

In order to obtain a 3D image, the light sheet needs to illuminate the different parts of the specimen. Since the distance between the light sheet and the objective is kept equal to the focal distance, the most usual approach to obtain the set of 2D images consist in a displacement (see FIG. 4A) or rotation of the specimen (see FIG. 4B). This will result in collection of 2D images which are computer combined to generate a 3D image. Alternatively, the light sheet can be scanned (displaced) in the z direction, but in this case, the collection objective must be also displaced in the z direction to maintain the distance with the light sheet constant (see FIG. 4C).

According to preferred embodiments, a Wavefront Encoding (WFE) element or WFE system is placed at the exit pupil of the objective lens in the collection arm of a LSM as described above to extend the depth of field of the imaging system in LSM.

WFE refers to the use of a phase modulating element or system in conjunction with deconvolution algorithm to extend the depth of field (EDoF) of a imaging system while efficiently keeping the light throughput of the system (see e.g. patents PCT/US1999/009546, U.S. Pat. No. 6,940,649 B2, U.S. Pat. No. 7,583,442 B2).

In general in WFE, the phase modulating element or system is a mask or a combination of optical elements which is placed at the exit pupil plane (or any of its conjugated planes) of the imaging lens (for example of an objective) or imaging system. The WFE element or system introduces an optical path difference that result in a phase modulation. Examples are in transmission by refractive index changes, thickness or variations in the transmittance/absorbance of the WFE element, in reflection by variations in the surface profile of the WFE element.

Wavefront encoding phase elements can, in general, be described by the formula describing the spatial phase profile introduced by the WFE to the light passing through it:

$$\text{phase}(x, y) = \exp\left(j \sum_k \sum_l a_{kl} x^k y^l\right)$$

Where j is the imaginary unit, k,l are integers and $0 \le k, l < \infty$. This formula can be interpreted as: any phase mask intended for the extension of the DoF can be generated as a linear combination of Legendre polynomials over a predefined pupil shape. Any equivalent representation using other bases (e.g. Zernike polynomials) can be transformed to the said formula by doing the appropriate linear transformation of change of basis. Cubic WFE element, which is the most common implementation, has been shown to offer a good trade-off between DoF extension and sensitivity to noise in the post-processing step. This family of masks can be described by:

$$\text{phase}(x,y) = \exp(j\alpha(x^3+y^3)),$$

where $\alpha$ represents the strength of the mask. For high values of $\alpha$ the invariance of the PSF extends over larger volumes but the noise amplification in the post-processed images is also increased. In microscopy applications the presence of spherical aberration is an important issue that can be mitigated by the use of wavefront encoding. For this, a generalized cubic PM of the form:

$$\text{phase}(x,y) = \exp(j[\alpha(x^3+y^3)+\beta(x^2y+y^2x)])$$

can be employed, where the values of $\alpha$ and $\beta$ are optimized for the requirements of each particular experiment. When $\beta=-3\alpha$ the former equation can be written in polar form as:

$$\text{phase}(\rho,\theta) = \exp(j f \alpha \rho^3 \cos(3\theta)]).$$

Here $\rho$ and $\theta$ are the normalized pupil radius and the azimuthal angle, respectively. This expression resembles the trefoil components of the Zernike polynomials, allowing a straightforward synthesis of these masks in any wavefront-correction based modulator such as deformable mirrors and spatial light modulators.

Another special family of WFE elements that can be implemented is based in a rotational symmetry given by:

$$\text{phase}(\delta) = \exp\left(j \sum_k \alpha_k \rho^k\right)$$

Where $\rho$ are the normalized pupil radius and $\alpha$ is related with the angle of the cone that determines the amount of DoF extension. In the particular case of k=1 it refers to a conical lens or axicon that can be described as:

$$\text{phase}(\delta) = \exp(j\alpha\rho)$$

More flexibility to adjust the DoF can be obtained by changing the polynomial dependence of the phase profile to a logarithmic one, that can be expressed either as:

$$\text{phase}(\rho) = \exp\left(\frac{j}{2\alpha}\ln(\beta-\alpha\rho^2)\right)$$

Or $$\text{phase}(\rho) = \exp\left(-\frac{j}{2\alpha}\ln(\beta+\alpha\rho^2)\right)$$

Where $\alpha$ and $\beta$ cam be varied to adjust the extension of the DoF. The former equation describes the backwards and the latter the forward version of the logarithmic axicon.

The use of other phases with different shapes that are able to extend the DoF of an imaging system and that are not mentioned here can also be used.

The resulting recorded 3D image is processed to recover the final 3D image. This could be done by using appropriate deconvolution methods.

Figure 5:
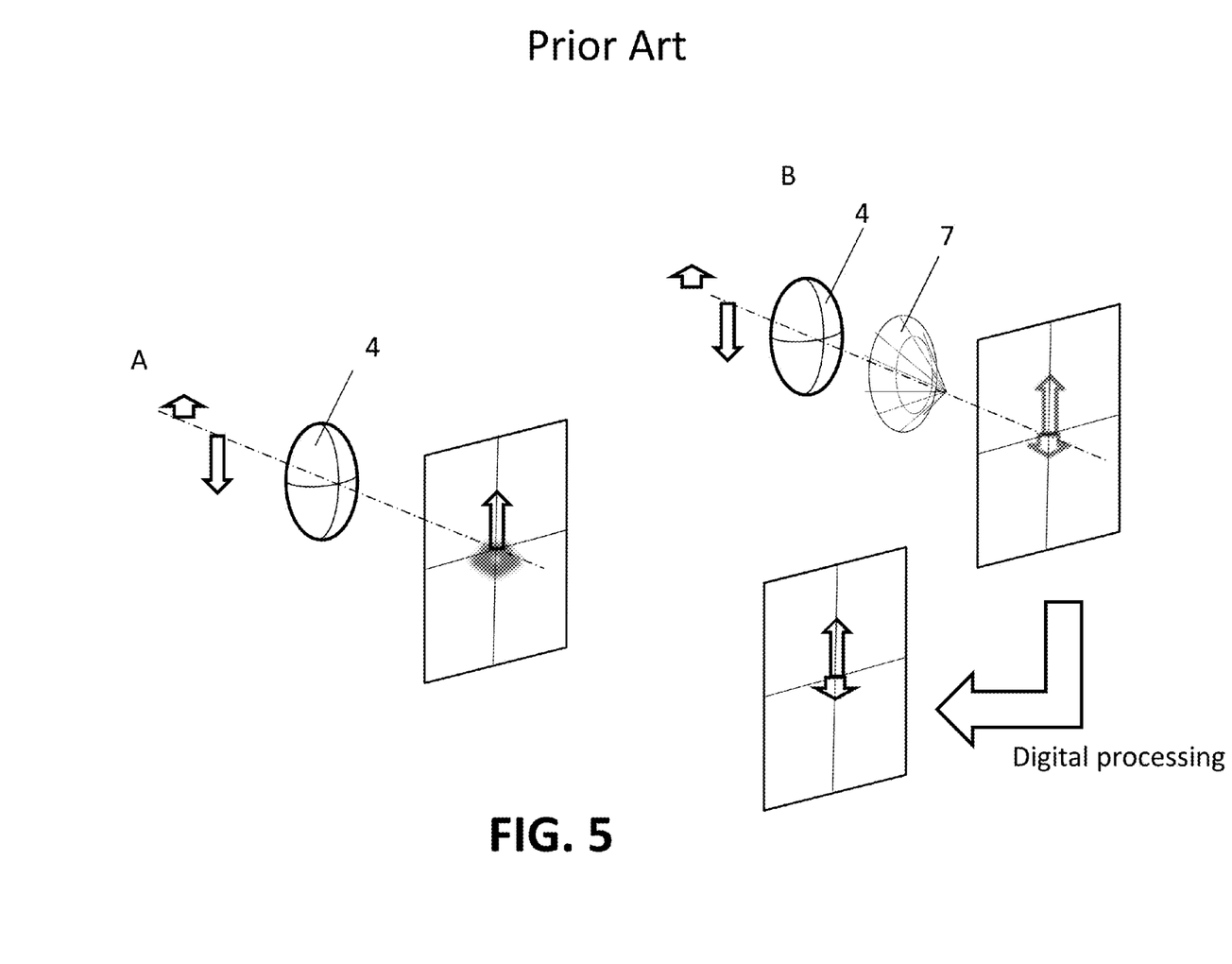
FIG. 5 is a diagram showing wavefront encoding, as used in some embodiments of the invention.

As shown in FIG. 5A, standard wide-field microscopes are capable to correctly image objects located at the objective focal distance. In one example, a standard wide-field microscope is converted to a WFE system with an extended depth of field. The WFE element is designed to produce a determined DoF and it is simply placed in the back pupil of the microscope objective. Once the WFE element is known, an appropriate digital inverse filter can be designed by measuring the PSF. The digital restoration is then performed by deconvolution. This result in a 2D image that is the projection within the extended DoF direction of the 3D imaged object (see FIG. 5B).

WFE used alone has however several problems when imaging a 3D object:

The 3D structure is encoded in the resulting 2D image but the 3D image cannot be recovered. This is incompatible with the concept of optical sectioning and results in a system incapable of depth discrimination.

WFE may introduce a lateral shift in the image of the specimen features at planes away from the best focus position. This introduces artefacts in the resulting image that cannot be identified nor corrected with image post-processing.

WFE causes a change of the magnification along the z axis (perspective projection), which introduces image artefacts and that cannot be identified, nor corrected with image post-processing.

The illuminated region of the specimen outside the designed extended DoF appears as a noise (a blurring) in the resulting 2D image.

To efficiently reconstruct the image, WFE algorithms require the point spread function (PSF) to be invariant along the DoF. This is not normally the case.

Figure 6:
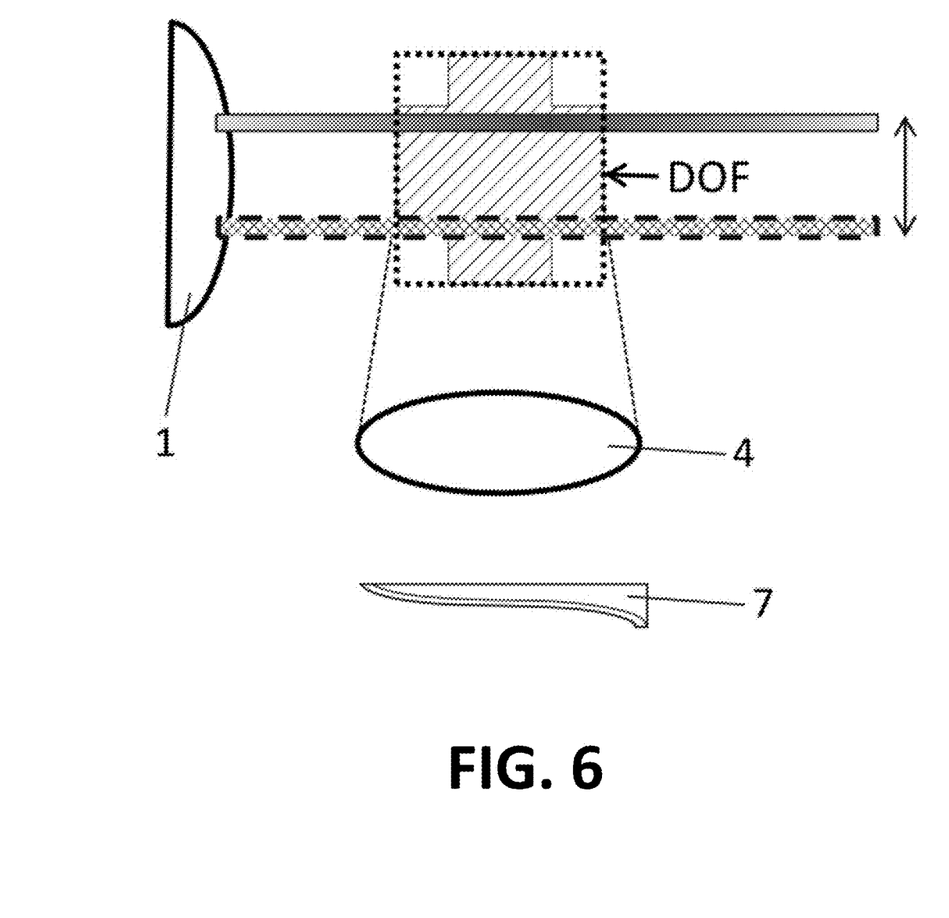
FIG. 6 is a diagram of a schematic of WFE, as used in some embodiments of the invention.

According to preferred embodiments of the invention, as shown in FIG. 6, a WFE, 7, is placed in the exit pupil plane (or any of its conjugated planes) of the objective lens of a LSM. The light sheet created by the light sheet generator is scanned in the z direction while the objective lens, 4, and the specimen are both kept static. By placing a wavefront encoding (WFE) element/system, 7, at the exit pupil (or at any of its conjugated planes) of the objective lens, 4, its depth of field is increased. By scanning the light sheet trough the specimen and within the extended DoF, 2D images for each z-position of the light sheet can be collected to create a 3D image.

The WFE element is a single optical element, whereas WFE system is a combination of optical elements. Both result in a phase modulation described by a linear combination of Legendre polynomials, a cubic function, generalised cubic function, detailed generalised cubic function, polynomial with rotation symmetry including axicons and logarithm axicons and all the wavefront phases as described above, or any equivalent that results in an extended DoF.

The WFE element works in transmission or reflection configurations and the required phase modulation is introduced by refractive index changes, material thickness or variations in the surface profile. These are designed to be placed between the objective lens and the detection unit, normally at the exit pupil plane of the objective lens. Examples of these are phase masks, rigid shaped mirrors, deformable mirrors, liquid crystals spatial light modulators (SLM), diffractive optical elements, holographic elements, micro-mirrors, photorefractive elements, axicons.

The WFE system can also work in transmission or reflection and the required phase modulation can be introduced by refractive index changes, material thickness, variations in the surface profile, and variations in the transmittance/absorbance. These are designed normally to be placed in a conjugated plane, normally using a 4f configuration, with the exit pupil plane of the objective lens. Examples of these are optical systems that incorporate refractive or diffractive lenses in combination with phase masks, rigid shaped mirrors, deformable mirrors, liquid crystals SLM, diffractive optical elements, holographic elements, micromirrors, photorefractive elements, axicons, amplitude masks, binary masks.

In the case of using deformable mirrors (DM) or spatial light modulators (SLM), the surface profile, transmission or refractive index can be changed actively to adapt the depth of field to any specific requirement. This can be done by the use of wavefront sensors (WS). The WS is previously calibrated and is used to measures the wavefront at the pupil or any conjugated plane of the imaging system. Through a feedback loop, the WS set the desired shape to the DM or SLM that produces the required phase modulation.

Figure 7:
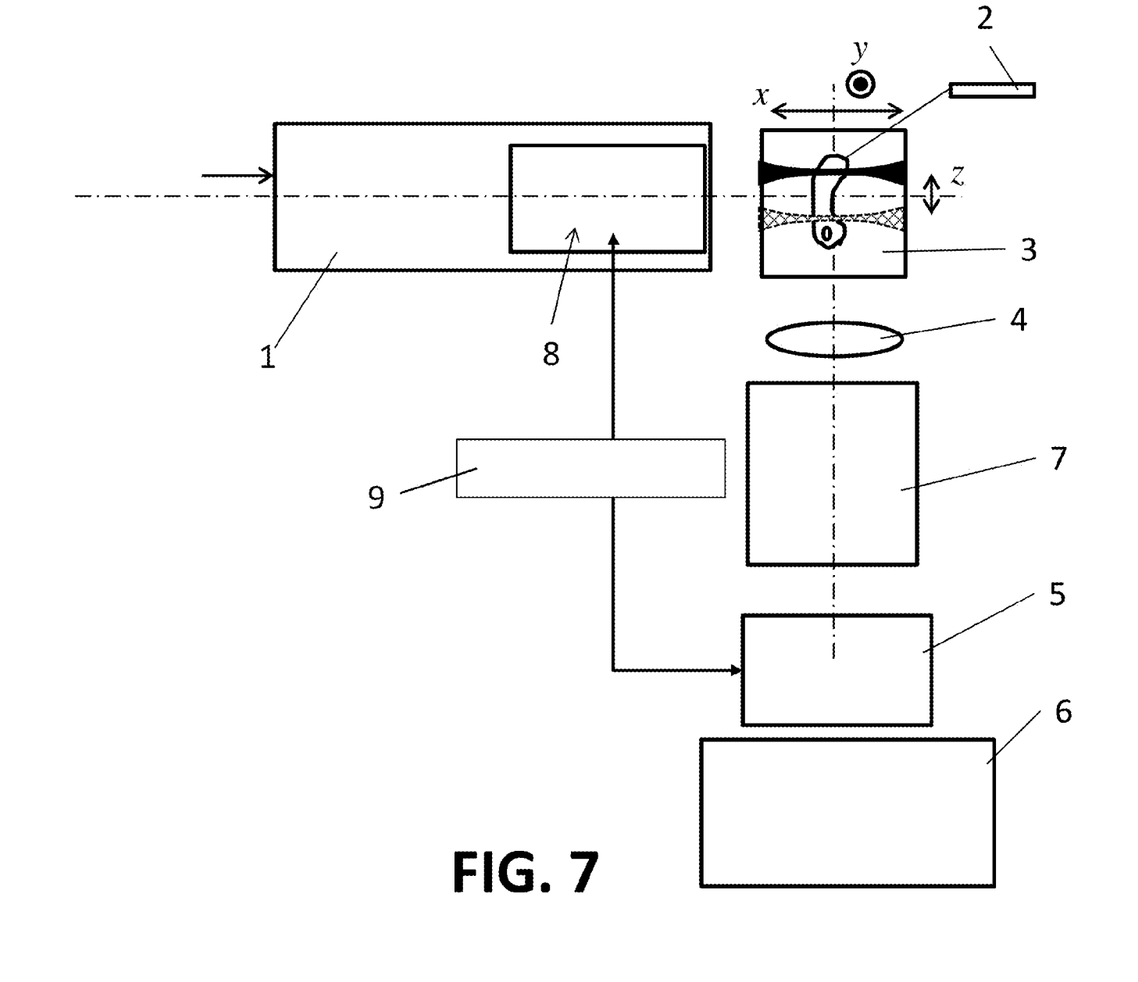
FIG. 7 is a diagram showing the basic scheme of some embodiments of the invention.

FIG. 7 illustrates a generalized embodiment of the invention, which should not be interpreted as restricting the scope of the invention, but is an example of how the invention can be embodied. As shown in FIG. 7, a light sheet, created by a light-sheet generator, 1, is projected into the specimen which is hold by a specimen holder, 2, and may be placed inside a proper chamber, 3, to ensure adequate conditions for preserving the specimen. A z-light sheet scanning unit, 8, is incorporated into the light sheet generator to axially (z-direction) displace the light sheet. The objective lens, 4, is kept fixed and its DoF is extended by the WFE element or system, 7, that is placed at the exit pupil plane or at any of its conjugated planes. A detection unit, 5, captures the images generated by the light sheet in a synchronised way, by means of a synchronisation unit, 9, as the light sheet is displaced in the z direction. A 3D image is then obtained by a digital processing unit, 6, after being properly decoded by an adequate deconvolution process.

Figure 8:
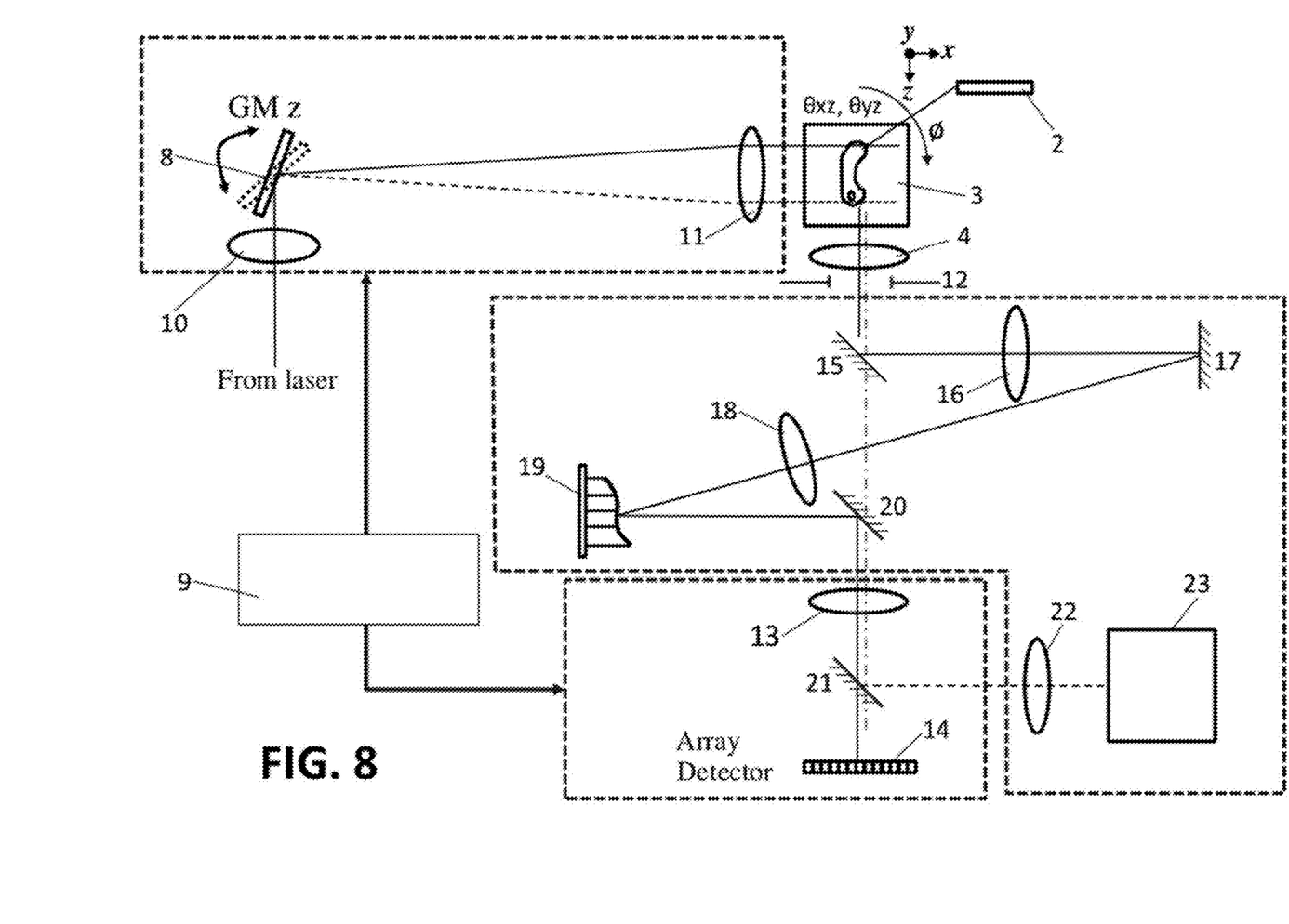
FIG. 8 is a diagram showing a preferred embodiment of the invention.

FIG. 8 shows a preferred embodiment of the invention based on a WFE system which should not be interpreted as restricting the scope of the invention, but is an example of how the invention can be implemented.

The light sheet generator consists of a cylindrical lens, 10, and an excitation lens, 11, separated by the sum of their focal distances. This produces a light sheet in the x, y, plane at the focal position of the excitation lens.

The z-Light-sheet Scanning Unit, 8, consists of a galvanometric mirror that scans the excitation beam in the z-direction. This is located at a distance equal to the focal length of the excitation lens.

The specimen, located at the specimen plane, is held by a specimen holder, 2, with six degrees of freedom, position (x, y, z) and angles (φ, θxz and θyz). The chamber, 3, contains the adequate conditions to allow proper optical excitation and collection of light while maintaining the proper conditions for the specimen (humidity, temperature, pH, osmotic pressure, etc).

The objective lens, 4, is placed at a distance equal to its focal length from the optical axis of the excitation arm.

A wavefront encoding system is placed in the detection arm. This is composed of relay system, consisting of a couple of relay lenses, 16 and 18, that conjugate the exit pupil of the objective lens, 12, to the surface of a deformable mirror, 19 (mirrors, 15 and 17 are used only for steering the beam). The deformable mirror is used to produce the appropriate phase modulation required for wavefront encoding, typically a cubic phase mask. This WFE system also incorporates a wavefront sensor, 23, to ensure the proper shape of the mirror according to the required phase modulation. Note that for convenience, we have incorporated a wavefront sensor which is only needed for calibration of the mirror. In our configuration, the wavefront sensor is placed at a conjugated plane of the surface of the mirror using a couple of relay lenses, 13 and 22. Mirror 21 is only used to steer the light into the wavefront sensor and it has to be removed from the optical path once the correct phase is produced on the deformable mirror.

The detection unit consists of a tube lens, 13, that is used to focus the collected light by the objective lens, 4, into the active area of the 2D image detector, 14 (mirror 21 is removed from the optical path). Capturing of the images is made in a synchronised way with the displacement of the light sheet in z direction using a synchronisation unit, 9.

The system can be used as a regular LSM by removing mirrors 15, 20 and 21.

According to some embodiments, a light sheet, created by any method, placed within the EDoF, will be correctly imaged by the detection unit. This relaxes the distance requirement between light sheet and objective, resulting in a simpler alignment.

According to some embodiments, once the designed WFE element is placed in between the objective lens and the detection unit, the objective lens can be replaced and no critical refocusing is needed.

According to some embodiments, a light sheet, created by any method, which is deformed by the changes of refractive index in the specimen can be correctly imaged by the detection unit as far as the light sheet falls within the extended DoF.

According some embodiments, the displacement in the position of the light sheet and in the focal length of the objective lens that are caused by changes in the refractive index of the specimen can be correctly imaged by the detection unit as the light sheet still falls within the extended DoF. This can be achieved as usually the extended DoF is on the orders of tens to hundreds of microns and the displacement of the focus is in the order of a few microns.

According some embodiments, a light sheet scanned in the z direction within the limits of the extended DoF will be correctly imaged by the detection unit for any position of the light sheet (FIG. 6). Therefore 2D images at different z positions of the light sheet can be captured to reconstruct a 3D image without the need to move neither the specimen nor the collecting objective. In this way, the mechanical movement and pressure waves do not affect the specimen, and the specimen development and viability is not compromised. Here the method for scanning the light sheet in the z direction can be produced by any means, including mechanical mirrors, driven by stepper or galvanometer motors, Acousto-Optic Modulator (AOM), Digital Micromirror Devices (DMD/DLP), Grating Light Valves, Liquid Crystal Digital Light Deflectors, Inorganic Digital Light Deflectors, or polygonal rotating mirrors. In this case, the speed of the 3D imaging is limited only by the speed given by the scanning system and the capture time of the detection unit.

According to some embodiments, both, the lateral shift in the image of the specimen and the magnification caused by the WFE element can be characterized for any position of the light sheet in the z direction, and be corrected with post-processing imaging techniques. A method to correct both effects consists in using a specimen of micro beads for acquiring point spread functions (PSF) at different depths. These PSF are acquired with both standard light sheet system for reference, and with the EDOF light sheet system. A process of image registration is employed afterwards, obtaining the transformation operators for translation, rotation and deformation based on the spatial coordinates X, Y, Z from the same microbeads obtained from both optical systems. Then any 3D image from a specimen can be correctly reconstructed using the obtained transformation operators.

According to some embodiments, the position of the light sheet and/or the amplitude of the scanning of the light sheet in the z direction can be adjusted to fall within the DoF. Therefore no region outside the extended DoF is illuminated and does not result in noise in the resulting 2D images.

According to some embodiments, the PSF can be characterized for any position of the light sheet in the z direction, and therefore the invariant nature of the PSF in the z direction is no longer needed. As a consequence, the artifacts present in traditional extended DOF microscopes that rely on one single invariant PSF for digitally restoring the entire volume can be avoided.

Similarly to the classical LSM, preferred embodiments of the invention can exploit the advantages of having an extended DOF to combine LSM with other microscopy techniques, such as Stochastic optic reconstruction microscopy (STORM), Photoactivation light microscopy (PALM), Structured Illumination Microscopy (SIM), Raman microespectroscopy, Foster resonant energy transfer microscopy (FRET), Stimulated emission depletion microscopy (STED), Optical Projection Tomography (OPT), Ratiometric imaging, Polarization anisotropy, etc, but with the advantage that it is a non-invasive (non-perturbing), fast and ultra stable technique capable to image large specimens and follow in vivo fast dynamics or fast single particle tracking.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is not limited to the specific embodiment(s) described herein, but also encompasses any variations that may be considered by any person skilled in the art (for example, as regards the choice of materials, dimensions, components, configuration, etc.), within the spirit of the invention.

What is claimed is:

1. A light sheet microscope for recording 3D images of a specimen, comprising:
   a light sheet generator and sheet scanning unit that produces a light sheet that is scanned through the specimen,
   an objective lens positioned to receive the signal generated by the scanned light sheets and an image detector positioned to receive light from the objective lens,
   a wavefront encoder (WFE) element or system positioned between the objective lens and the image detector at an exit pupil plane or a conjugated plane of the objective lens, wherein the WFE extends the depth of field of the objective lens, and wherein the WFE is selected to generate an optical path difference resulting in a phase modulation that permits creating a 3D image from 2D images generated by scanning the light sheet with the scanning unit while the objective lens and the specimen are static.

2. The light sheet microscope according to claim 1, wherein the wavefront encoder element is a single optical element that is adapted to introduce an optical path difference that results in a phase modulation described by a linear combination of Legendre polynomials, a cubic profile or a polynomial with rotation symmetry.

3. The light sheet microscope according to claim 2, where the WFE element works in a transmission configuration or a reflection configuration.

4. The light sheet microscope according to claim 2, where the WFE element is a phase mask.

5. The light sheet microscope according to claim 2, where the WFE element is an axicon.

6. The light sheet microscope according to claim 2, where the WFE element or system is actively changed to adapt the depth of field to a specific requirement.

7. The light sheet microscope according to claim 1, where the wavefront encoder system is a combination of optical elements, the combination adapted to introduce an optical path difference that results in a phase modulation described by a linear combination of Legendre polynomials, a cubic profile or a polynomial with rotation symmetry.

8. The light sheet microscope according to claim 7, where the WFE system works in a transmission configuration or a reflection configuration.

9. The light sheet microscope according to claim 7, wherein the wavefront encoding system comprises a deformable mirror and a relay system formed by a set of relay lenses that conjugate the exit pupil of the objective lens to the surface of the deformable mirror whose surface profile is modulated to result in an extended DoF.

10. The light sheet microscope according to claim 9, wherein a wavefront sensor is placed at a conjugated plane of the surface of the deformable mirror for measuring and controlling the phase modulation introduced by the deformable mirror.

11. The light sheet microscope according to claim 7 where the WFE element or system is actively changed to adapt the depth of field to a specific requirement.

12. The light sheet microscope according to claim 1 further comprising a digital processing unit for decoding by an adequate deconvolution process the 2D images obtained by the image detector and transforming them into 3D images.

* * * * *